United States Patent Office 2,729,428
Patented Jan. 3, 1956

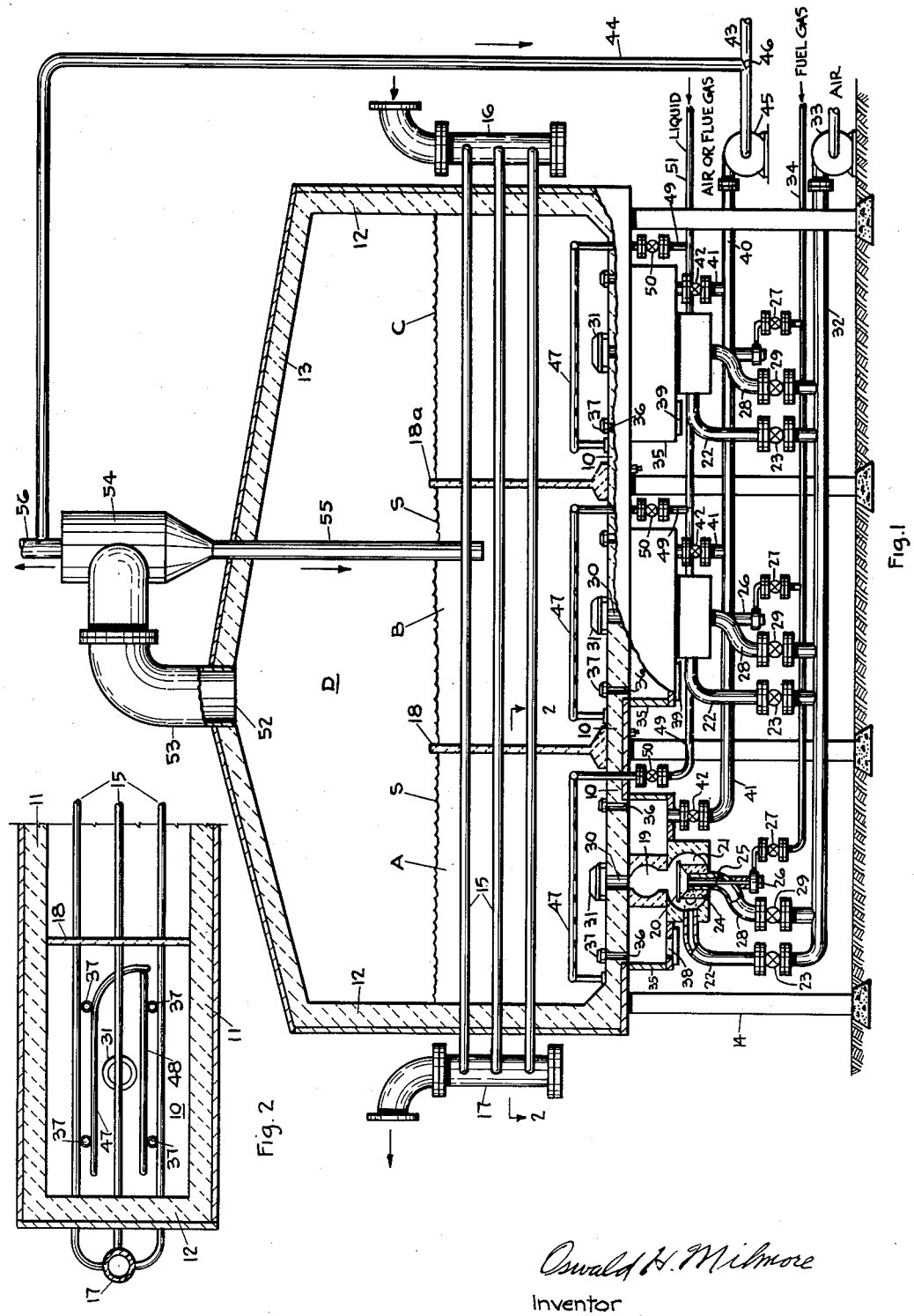

2,729,428

FLUIDIZED BED TEMPERATURE CONDITIONER AND METHOD OF CONTROLLING TEMPERATURES OF FLUID STREAMS

Oswald H. Milmore, Berkeley, Calif., assignor to Shell Development Company, Emeryville, Calif., a corporation of Delaware Application April 20, 1953, Serial No. 349,700

11 Claims. (Cl. 257—6)

The invention relates to an apparatus and method for controlling the temperature of fluid process streams, such as streams of reactants, wherein the stream passes through a tube having a heat-conductive wall that is immersed in a dense fluidized bed of heat-retentive solids for heating or cooling the tube wall. Devices of this type, when used to heat process streams, are known as fluidized bed heaters, but may also be employed to abstract heat from the stream, e. g., in the case of fluids undergoing exothermic reaction or to reduce the temperature of an endothermically reacting stream at a certain stage.

The direct transfer of heat between a heat-conductive tube wall and a thermal fluid, for example a liquid or gas such as hot combustion gas, that is used for heating or cooling the tube is often not practicable because of low heat transfer rates, requiring excessive differences between the temperatures of the tube wall and thermal fluid, which lead to undesirable tube temperature fluctuations when the demand for heat transfer changes for any reason. Thus, when an endothermically reacting mixture flows through a tube, any decrease in the flow rate will require a corresponding decrease in the rate of heat transfer from the thermal fluid to the tube and mixture, but at such high temperature differences the rate of heat transfer is not appreciably reduced with a moderate rise in the tube temperature, with the result that the tube wall becomes excessively hot. Far greater heat transfer coefficients are realized when the heat transfer wall is immersed in a turbulent bed of finely divided, heat retentive solids that are fluidized by a gas that also supplies heat or abstracts heat from the solids. The fine solids, having a large surface area, undergo rapid heat transfer with respect to the gas and assume an essentially uniform temperature throughout the bed; also, a high rate of heat transfer occurs between the tube wall and the solids that come into frequent cotnact with the wall, resulting in high overall heat transfer coefficients that make it possible to use lower temperature differences. This results in smaller fluctuations in the tube wall temperature upon changes in demand for heat transfer.

A drawback of prior fluidized bed heaters or coolers under certain conditions has been the great uniformity of temperature throughout the bed, that has prevented establishment of different, controllable temperature levels along the length of the tube. The independent control of the temperature of a process stream at successive points along the path of travel of the stream is, however, often desirable. For example, while it is advantageous to bring the temperature of a mixture to undergo endothermic reaction rapidly to the reaction temperature, which implies the maintenance of a fairly high temperature at the first part of a reaction tube wherein the reaction commences, lower fluidized bed and tube wall temperatures may be desirable at subsequent points of the tube, wherein the reaction proceeds at a progressively diminishing rate, so that the rate of heat transfer into the tube at any point will correspond to the local reaction rate and the process stream is maintained at more or less uniform temperature. In other cases it may be desired to maintain the endothermically reacting stream at a different temperature at each of several succeeding stages of the reaction in accordance with changes in its composition, and even to quench the reaction by cooling at the end of the tube. Similarly, in the case of exothermic reactions it is desirable to bring the stream up to reaction temperature and then to abstract heat at a rate that varies along the length of the tube in accordance with the variations in the reaction rate; in many instances the optimum reaction temperature is not uniform but varies as the reaction proceeds. (See U. S. patent to Luten, No. 2,590,436.) Such control of temperature has been impracticable with fluidized bed heaters or coolers of the horizontal type, wherein the beds are of modest height and the tubes extend horizontally or in substantially horizontal banks. While temperature gradients along the length of a tube can be established by designs employing vertical tubes they are not well adapted for establishing temperature profiles that are irregular or very steep.

It is an object of this invention to provide an improved method of and apparatus for controlling the temperature of a fluid stream by means of a fluidized bed of heat-retentive solids whereby the temperature of the stream can be readily controlled independently at successive points along the path of travel of the stream.

A further object is to provide a fluidized bed temperature conditioner, i. e., a heater or cooler or combined heater and cooler, of the horizontal type that is of simple construction and adapted for maintaining a plurality of fluidized beds of heat-retentive solids at independently controllable temperatures for independent regulation of the temperature of different parts of tubes that traverse the several fluidized beds.

In summary, according to the invention, the temperature conditioner includes a housing having at the lower part thereof a series of upright partitions that extend partly to the top and divide the housing into a plurality of compartments that are in free communication at their upper parts with the space in the upper part of the housing, and tubes for the fluid to be conditioned that traverse the several compartments below the tops of the partitions, the tubes being disposed in any desired arrangement, such as horizontal, inclined or zig-zag. Each compartment is provided with means for admitting fluidizing gas to maintain within each compartment a dense fluidized bed of heat-retentive solids in external contact with the tubes, the temperatures of the solids in the several compartments being individually controllable, preferably by control of the temperature of the fluidizing gas. The gas may consist of or contain combustion products produced by burning fuel within the lower parts of the fluidized beds or in separate combustion zones situated outside, e. g., beneath the fluidized beds; in other cases air, steam or flue gas may be used. The fluidizing gas moves upwards from the several compartments into the upper space of the housing and is discharged therefrom, preferably passing through one or more separating devices, such as cyclones, for recovering entrained heat-retentive solids.

The invention will be described in greater detail with reference to the accompanying drawing, showing by way of example one preferred embodiment of the invention, wherein:

Figure 1 is a longitudinal sectional view through a temperature conditioner suitable for carrying out the method; and Figure 2 is a fragmentary transverse sectional view, taken on the horizontal plane indicated at 2—2 on Figure 1.

Referring to the drawings, the temperature conditioner includes a wall structure including a bottom 10, side walls 11, end walls 12 and an arch or roof wall 13, collectively defining a housing. The housing may be supported above the ground by piers 14. A bank of tubes 15 having heat-conductive walls extends near the bottom of the housing, the tubes being in flow communication with a supply header 16 from which the process stream is distributed to the several tubes and with a discharge header 17. The housing has a plurality of upright partitions 18, 18a, that extend transversely across the housing the full distance between the side walls and from the floor only partly to the arch, dividing the housing into a plurality of compartments A, B and C, that are in free communication at the top with the space D in the upper part of the housing. The partitions may be bolted to the floor as shown and their positions may be made adjustable along the length of the housing to vary the sizes of the compartments. The tubes 15 traverse the several compartments; while straight horizontal tubes extending through holes in the partitions are shown for purposes of illustration, it should be understood that the invention is not limited thereto and that tubes may be installed as coils in any desired course, and may be laid over the tops of the partitions, as understood in the heating art, the only requirement being that the tubes traverse the several compartments so as to have parts thereof situated within each compartment, i. e., beneath the tops of the partitions. The walls and partitions may be made of refractory material, as indicated in the drawing.

Each compartment, or at least every compartment to be used for heating, has at least one combustion device for supplying hot combustion gases into a lower part of the compartment. The construction may be of any suitable design and neither claim for novelty nor restriction to the specific construction shown is intended. Thus, the combustion device may include a combustion chamber 19 having refractory walls and the bottom of which is constricted; beneath the constriction is an annular baffle plate 20 leaving an annular passage above the baffle leading to an air box 21 into which secondary combustion air is admitted tangentially from an air duct 22 at a rate controlled by a shutter or valve 23. The burner is situated in the central bore of a burner block 24 and includes a fuel nozzle and the upper end of a pipe 25 of suitable type for gaseous or liquid fuel, supplied through a pipe 26 at a rate controlled by a flow control valve 27. Primary combustion air is supplied to the bore of the burner block through an air duct 28 which is concentric with and contains the burner pipe 25, at a rate controlled by a shutter or valve 29. The top of each combustion chamber communicates to the respective compartment through a duct or passage 30 which may be covered by a suitable deflector or cap 31 that extends laterally over the margin of the duct to prevent or minimize the entry of solids into the duct and combustion chamber when the burner is not in operation. It should be understood that several of such burners may be provided for each compartment or distributing grids, well known per se in the fluidization art, may be used for attaining better distribution over the area of the floor in the case of large areas and thereby achieving more effective fluidization. Also, combustion can be carried out above the floor 10, e. g., as disclosed in U. S. Patent No. 2,610,842. In any arrangement adopted, the combustion devices are provided with the necessary air valves 23 and 29 and fuel valves 27 to permit individual adjustment for each compartment of the rate at which fuel is burned. The air ducts may be supplied with air under suitable pressure from a common air main 32 provided with a compressor 33 and the fuel pipes may be supplied from a common supply pipe 34 to which fuel, such as fuel gas, is supplied under pressure.

Each compartment may optionally be further provided with a separate fluidizing gas inlet. Thus, a gas box 35 may be provided beneath each compartment surrounding the combustion chamber and placed into communication with the compartment through a plurality, e. g., four openings 36, each having a cap 37 to reduce the passage of solids into the gas box. Each box may further have a clean-out opening 38 that is normally closed by a closure 39. Each gas box is connected to a source of fluidizing gas, such as a fluidizing gas main 40 by a branch duct 41 having an individual shutter 42. The gas main is supplied with a suitable gas, such as atmospheric or pre-heated air from an inlet 43 or with recirculated flue gas from a duct 44, pressurized by a blower 45, a damper 46 being provided for selecting influx of air or gas or of both in any desired ratio into the suction side of the blower.

Each compartment wherein cooling is to be effected may optionally be provided with means for admitting a liquid. Thus, each compartment may have a pair of perforated pipes 47, 48, connected to a branch pipe 49 having a valve 50 and supplied with liquid from a supply pipe 51.

The top of the housing has a discharge opening 52 for withdrawing gas from the space D communicating through a duct 53 to a solids separating device, such as a cyclone 54. The solids outlet of the cyclone is connected to a suitable return duct, such as a dip leg 55 that extends into one of the compartments to a level beneath the tops of the partitions, so as to be immersed in the dense fluidized bed. Gas, freed from solids, is either rejected from the system through a vent 56 or recycled in part through the duct 44.

The apparatus is charged with a suitable quantity of finely divided heat-retentive solids. The solids, which serve to transmit heat to the tubes 15, are in most cases graded sand particles, advantageously of substantially uniform size; however, other solids, such as metal oxides of the type used as catalysts may be used. Without limiting the invention thereto it may be stated that graded sand having particle diameters from about 0.005 to 0.1 inch is preferred. The quantity of solids is preferably such that the surface or upper boundary of the dense fluidized beds in the several compartments produced during operation is at or near to the tops of the partitions 18 and 18a. However, operation with precisely such a level is not essential, since one or more compartments may be operated at a lower level; conversely, a level slightly higher may be used, but then there is a tendency for the temperatures of the solids in two adjoining compartments to approach each other.

In operation, when used as a heater, the process stream is passed through the tubes 15 from the supply header 16 to the discharge header 17, and the burners are operated by admitting fuel through the valves 27 and air through the valves 23 and 29. The resulting combustion products enter the respective compartments through the passages 30 and ascend through the solid particles to heat them; they further act as fluidizing gas to effect fluidization of the solids. The resulting fluidized bed has a fraction of voids that is usually between about 0.30 and 0.80, and has an upper surface or boundary S. The upward velocity of fluidizing required depends upon the density and size of the solid particles and upon the density of the gas and can be readily determined empirically. As is understood in the art, a "fluidized bed" is a mass of solid particles in a state of hindered settling in a fluidizing gas, the mass exhibiting liquid-like mobility, a hydrostatic pressure and an observable upper free boundary. Such beds are also known as dense turbulent beds, and should be distinguished from fixed or quiescent beds wherein little or no mixing occurs and wherein markedly lower heat transfer coefficients prevail. In the fluidized beds employed in the instant method and apparatus the solid particles are subjected to rapid movements and come into frequent external contact with the tubes 15 to effect rapid heat transfer, and heat transfer coefficients between 25 and 100 B. t. u. per sq. ft. per degree F. per hour are typical; the temperature of the solids within any one compartment is substantially uniform. To attain high heat transfer coefficients it is desirable to maintain a state of turbulence or mobility such that the particle Reynolds number is at least 2 and, preferably, above 5. The particle Reynolds number is a dimensionless number defined by the formula:

$$\frac{Du\rho}{\mu}$$

wherein D is the particle diameter, $u$ is the velocity of the particle with respect to the ascending fluidizing gas, $\rho$ is the density of the gas and $\mu$ is the viscosity of the gas, all in consistent units.

The fluidizing gas escapes from the upper bed surface S of each compartment into the common space D, entraining a small number of solids and enters the cyclone 54 wherein the entrained solids are separated and from which they are returned through the dip leg 55, which extends into the compartment B beneath the surface S; thereby a body of solid particles is maintained in the dip leg to form a seal and prevent the upflow of gas through the leg. It is evident that other arrangements for preventing the influx of gas into the cyclone through the solids discharge passage may be employed, such arrangements as the provision of a valve in the solids return pipe being known. The returned solids overflow from the compartment B into which they are fed over the partitions into the adjoining compartments, whereby distribution of the solids among the compartments is automatic.

To maintain effective fluidization, i. e., to avoid pockets of solids in the quiescent state, it is advantageous to distribute fluidizing gas over the horizontal area of each compartment unless comparatively small compartments are used. As noted before, there may be several burners and passages 30 and/or distributing grids for each compartment. To obviate the need for multiplication of burners and ducts for hot combustion products, it is possible to employ only one or a small number of burners for each compartment and admit auxiliary fluidizing gas through the ports 36 from the gas box 35, the fluidizing gas being heated air or recirculated flue gas from the cyclone 53 and duct 44. Excess air admitted to the burners through the ducts 22 is in this case held to a minimum. Although the auxiliary gas will usually be cooler than the hot combustion gas, rapid equalization of temperature occurs within the fluidized bed.

For establishing the desired temperature control, the rates of combustion in the several burners are adjusted individually by means of the fuel valves 27 and/or by regulating the rate of auxiliary gas admitted through the shutters 42, since the latter exerts a cooling effect. It is evident that when the combustion rate is decreased there must usually be an offsetting increase in the rate of other gas, such as secondary air and/or auxiliary gas to maintain the upward gas velocity within the bed. Some heat transfer takes place through the partitions 18 and 18a, but this effect is small, so that the fluidized bed within each compartment can be operated essentially at its own selected and independently controlled temperature.

Some or all of the compartments may be used exclusively for abstracting heat from the tubes 15. In this case the burners are taken out of operation and fluidizing gas is admitted by any one or any combination of the following: (1) Air admitted through the combustion products passages 30 from the main 32, (2) air or recycled gas from inlet 43 or duct 44, pressurized by the blower 45 and admitted through the gas boxes 35 and ports 36, and (3) vaporizing a liquid within the compartment. The last of these expedients involves the admission of a liquid, such as water, into one or more compartments through the valves 50 and pipes 47 and 48. The pressure within the bed should be sufficiently low in relation to the vapor pressure of the liquid at the prevailing temperature to permit vaporization of the liquid upon coming into contact with the solids that are warmed by contact with the tubes. In general, it may be stated that it is desirable to have a pressure sufficiently low so that the vapor pressure of the water or other liquid for the lowest temperature of the tubes 15 is at least 20% greater than the pressure of the bed at the distributing pipes 47 and 48 to prevent condensation of liquid. Upon vaporization the liquid absorbs a large amount of heat, thereby cooling the solids; the generated vapors serve as fluidizing gas and augment the total gas when used in conjunction with other gas. When first starting up the apparatus it is usually necessary to admit steam or other gas into the compartment to effect fluidization, because in a quiescent bed the particles near the pipes 47 and 48 are not initially at a sufficiently high temperature to cause vaporization of the liquid; after the start-up the generated vapors may suffice to meet the total requirement of fluidizing gas. The temperature of the solids can be regulated within each compartment by controlling the rate at which liquid is admitted to and vaporized within the respective bed.

I claim as my invention:

1. The method of controlling the temperature of a process stream at successive points along the path of travel thereof which comprises flowing said stream through a tube that traverses a plurality of compartments of a fluidized bed temperature conditioner that are essentially horizontally isolated at least at the lower parts thereof and has a heat-conductive wall within each of said compartments, maintaining within each of said compartments a dense fluidized bed of finely divided heat-retentive solids in isolation from the fluidized beds in other compartments and in external contact with the portion of said tube that is situated within the respective compartment to effect direct heat transfer between the solids and the said heat-conductive tube wall by admitting a separate portion of fluidizing gas to the lower part of each compartment, withdrawing said portions of fluidizing gas from the upper parts of said compartments above the said tube, and controlling the temperatures of the heat-retentive solids within each of the several compartments independently of one another, whereby the temperature of the process stream is correspondingly controlled by passage through different portions of the tube situated within the respective compartments.

2. The method according to claim 1 wherein the step of controlling the temperatures of the heat-retentive solids includes the operation of burning fuel in a plurality of separate zones at individually controlled rates and utilizing the resulting combustion products from said zones in different compartments as fluidizing gas within for supplying heat to the solids therein.

3. The method according to claim 1 wherein the step of controlling the temperatures of the heat-retentive solids includes the operation of admitting a liquid into the lower part of at least one of said compartments, vaporizing said liquid in contact with said solids to cool the latter, and utilizing the resulting vapors as fluidizing gas.

4. The method of controlling the temperature of a process stream at successive points along the path of travel thereof which comprises flowing said stream through a tube that traverses a plurality of horizontally contiguous compartments of a fluidized bed temperature conditioner and has a heat-conductive wall within each of said compartments, said conditioner including a fluidization chamber and said compartments being horizontally isolated by partitions extending substantially from the bottom of the fluidization chamber substantially to a common level and being in free communication with a common chamber above the compartments, maintaining within each of said compartments a dense fluidized bed of finely divided heat-retentive solids in isolation from the fluidized beds in other compartments and in external contact with the portion of said tube that is situated within the respective compartment to effect direct heat transfer beween the solids and the said heat-conductive tube wall by admitting a separate portion of fluidizing gas to the lower part of each compartment, maintaining the upper level of each said dense fluidized bed substantially at the said common level of the upper ends of the partitions, withdrawing said portions of fluidizing gas from the upper parts of said compartments into said common chamber, separating entrained heat-retentive solids from the fluidizing gas admitted to said chamber and discharging the gas from the chamber while returning the separated solids to said compartments, effecting distribution of the said solids among the compartments by overflow over said partitions, and controlling the temperatures of the heat-retentive solids within each of the several compartments independently of one another, whereby the temperature of the process stream is correspondingly controlled by passage through different portions of the tube situated within the respective compartments.

5. A fluidized bed temperature conditioner for the controlled continuous indirect temperature control of a fluid stream at successive points along the path of travel thereof which comprises in combination a housing, a plurality of upright partitions extending substantially from the bottom of said housing only partly to the top thereof and defining a plurality of compartments that are in free communication with the upper part of the space within said housing, a tube for the passage of said fluid stream having a heat-conductive wall and traversing the said compartments below the tops of said partitions, means for admitting fluidizing gas into each of said compartments for maintaining a dense fluidized bed of finely divided, heat-retentive solids within each of said compartments in external contact with said tube and for passage upwards into said space in the upper part of the housing, means for discharging gas from said upper part of the housing, and means for controlling the temperatures of said heat-retentive solids within each of said compartments independently of the others.

6. A fluidized bed temperature conditioner according to claim 5 wherein said means for controlling the temperatures of said heat-retentive solids includes a plurality of combustion devices for a corresponding plurality of compartments, said devices being disposed to supply hot combustion gases into the compartments to form at least parts of said fluidizing gas, means for supplying fuel to said combustion devices, and means for controlling the rate of fuel admission to each combustion device independently of the rate of fuel admission to the other combustion devices.

7. A fluidized bed temperature conditioner according to claim 5 wherein said means for controlling the temperatures of said heat-retentive solids includes a plurality of combustion devices for a corresponding plurality of compartments, said devices being disposed to supply hot combustion gases into the compartments to form portions of said fluidizing gas, means for admitting supplemental fluidizing gas into said compartment at a temperature lower than that of said combustion gases, and means for controlling the rate of admission of said supplemental fluidizing gas into each compartment independently of the rate of admission of supplemental gas to the other compartments.

8. A fluidized bed temperature conditioner according to claim 5 wherein said means for controlling the temperatures of said heat-retentive solids includes conduit means for admitting liquid to at least one of said compartments into the lower part thereof for vaporization in contact with said heat-retentive solids to form vapors and cool said solids, and means for controlling the rate of admission of liquid to said compartment independently of the control of temperature in the other compartments.

9. A fluidized bed temperature conditioner according to claim 5 wherein said means for discharging gas from the housing includes a cyclone for removing entrained solids from the gas and a return conduit for returning separated solids into at least one of said compartments.

10. A fluidized bed temperature conditioner according to claim 9 wherein said return conduit is disposed to return said solids to only one of said compartments, whereby distribution of returned solids among the several compartments can occur only by flow between compartments over the said partitions.

11. A fluidized bed temperature conditioner according to claim 9 having a gas recycle conduit leading from said cyclone to the lower parts of at least some of said compartments and means for inducing flow of gas through said line.

References Cited in the file of this patent

UNITED STATES PATENTS

| | | |
|---|---|---|
| 2,506,317 | Rex | May 2, 1950 |
| 2,529,366 | Bauer | Nov. 7, 1950 |
| 2,567,959 | Munday | Sept. 18, 1951 |
| 2,610,842 | Schoemakers et al. | Sept. 16, 1952 |
| 2,629,938 | Montgomery | Mar. 3, 1953 |
| 2,641,849 | Lintz | June 16, 1953 |